United States Patent
Yang et al.

(10) Patent No.: US 10,541,415 B2
(45) Date of Patent: Jan. 21, 2020

(54) NEGATIVE ELECTRODE FOR LITHIUM SECONDARY BATTERY AND LITHIUM SECONDARY BATTERY INCLUDING THE SAME

(71) Applicants: Samsung Electronics Co., Ltd., Suwon-si, Gyeonggi-do (KR); Samsung SDI Co., Ltd., Yongin-si, Gyeonggi-do (KR)

(72) Inventors: Jeeeun Yang, Uiwang-si (KR); Seunguk Kwon, Yongin-si (KR); Kyueun Shim, Daejeon (KR); Hyoungwoo Choi, Hwaseong-si (KR); Sungsoo Han, Hwaseong-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 118 days.

(21) Appl. No.: 15/718,386

(22) Filed: Sep. 28, 2017

(65) Prior Publication Data
US 2018/0097235 A1 Apr. 5, 2018

(30) Foreign Application Priority Data
Sep. 30, 2016 (KR) .......................... 10-2016-0127144

(51) Int. Cl.
*H01M 4/62* (2006.01)
*H01M 4/13* (2010.01)
(Continued)

(52) U.S. Cl.
CPC ............ *H01M 4/622* (2013.01); *H01M 4/13* (2013.01); *H01M 4/38* (2013.01); *H01M 4/62* (2013.01);
(Continued)

(58) Field of Classification Search
CPC .......... H01M 4/622; H01M 4/38; H01M 4/13; H01M 4/62; H01M 4/625; H01M 10/052; H01M 2004/027; Y02T 10/7011
See application file for complete search history.

(56) References Cited

U.S. PATENT DOCUMENTS 8,455,138 B2   6/2013  Kim et al.
2013/0341205 A1* 12/2013 Baba ................. H01M 4/0438
                                                  205/644
(Continued)

FOREIGN PATENT DOCUMENTS

CN       102881861 B    1/2013
KR    1020070030487 A   3/2007
(Continued)

*Primary Examiner* — Laura Weiner
(74) *Attorney, Agent, or Firm* — Cantor Colburn LLP

(57) ABSTRACT

A negative electrode for a lithium secondary battery includes: a negative active material disposed on a current collector; a negative active material layer including a first binder and a conductive agent; and a protective layer disposed on the negative active material layer, wherein the protective layer is in direct contact with the current collector and includes a nonaqueous or aqueous second binder and an inorganic material, wherein, in the protective layer including the aqueous second binder and the inorganic material, the amount of the inorganic material may be about 65 parts by weight or greater, based on 100 parts by weight of the protective layer, and wherein the protective layer including the nonaqueous second binder and the inorganic material, the amount of the inorganic material may be in a range of about 5 parts to about 25 parts by weight, based on 100 parts by weight of the protective layer.

20 Claims, 12 Drawing Sheets

(51) Int. Cl.
*H01M 4/38* (2006.01)
*H01M 10/052* (2010.01)
*H01M 4/02* (2006.01)

(52) U.S. Cl.
CPC ......... *H01M 4/625* (2013.01); *H01M 10/052* (2013.01); *H01M 2004/027* (2013.01); *Y02T 10/7011* (2013.01)

(56) References Cited

U.S. PATENT DOCUMENTS

| | | |
|---|---|---|
| 2015/0155561 A1 | 6/2015 | Kim et al. |
| 2015/0194677 A1 | 7/2015 | Jeong et al. |
| 2015/0194678 A1 | 7/2015 | Jeong et al. |
| 2019/0044137 A1* | 2/2019 | Zhamu .................. H01M 4/525 |

FOREIGN PATENT DOCUMENTS

| | | |
|---|---|---|
| KR | 1020130117930 A | 10/2013 |
| KR | 1020140087769 A | 7/2014 |
| KR | 1020140087770 A | 7/2014 |
| KR | 1020150063270 A | 6/2015 |

* cited by examiner

NEGATIVE ELECTRODE FOR LITHIUM SECONDARY BATTERY AND LITHIUM SECONDARY BATTERY INCLUDING THE SAME

CROSS-REFERENCE TO RELATED APPLICATION

This application claims the benefit of Korean Patent Application No. 10-2016-0127144, filed on Sep. 30, 2016, in the Korean Intellectual Property Office, and all the benefits accruing therefrom under 35 U.S.C. § 119, the content of which is incorporated herein in its entirety by reference.

BACKGROUND

1. Field

The present disclosure relates to a negative electrode for a lithium secondary battery and a lithium secondary battery including the same.

2. Description of the Related Art

Due to their high energy density and convenient design, lithium secondary batteries have served as a source of electrical power for mobile electronic devices. Applications for a lithium secondary battery have broadened to allow for their use as a power source for an electrical vehicle or an electrical power storage device for renewable energy. The development of materials for a lithium secondary battery having high energy density and long lifespan characteristics has been ongoing. For example, materials such as silicon, tin, or germanium, as well as carbon, have been evaluated as negative active materials.

However, there remains a need for a negative active material that may suppress rapid volume expansion that occurs during a charging/discharging process and prevent a side reaction between a negative active material and an electrolyte.

SUMMARY

Provided is a negative electrode having enhanced durability by preventing electrode collapse caused by volume expansion.

According to an aspect of an embodiment, a negative electrode for a lithium secondary battery includes:

a negative active material disposed on a current collector; a negative active material layer including a first binder and a conductive agent; and a protective layer disposed on the negative active material layer, wherein the protective layer is in direct contact with the current collector and includes a nonaqueous or aqueous second binder, and an inorganic material, wherein, in the protective layer including the aqueous second binder and the inorganic material, the amount of the inorganic material is about 65 parts by weight or greater, based on 100 parts by weight of the protective layer, and wherein the protective layer including the nonaqueous second binder and the inorganic material, the amount of the inorganic material is in a range of about 5 parts to about 25 parts by weight, based on 100 parts by weight of the protective layer.

According to an aspect of another embodiment, a lithium secondary battery includes the negative electrode.

Additional aspects will be set forth in part in the description which follows and, in part, will be apparent from the description, or may be learned by practice of the presented embodiments.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
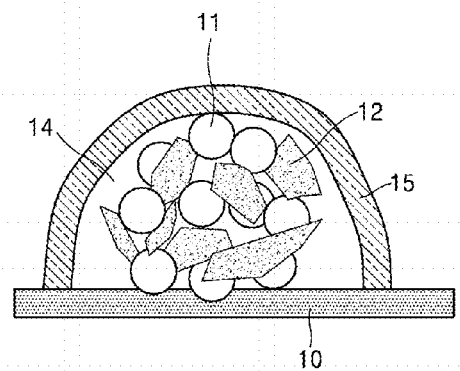
FIG. 1A is a schematic view illustrating a structure of an embodiment of a negative electrode for a lithium secondary battery.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A C rate is a measure of the rate a battery is charged or discharged relative to its maximum capacity. A 1C rate means a current which will discharge the entire capacity in one hour. Thus, for example, for a battery with a capacity of 100 ampere-hrs, a C rate discharge would be a discharge current of 100 amperes, a 5C rate for this battery would be 500 amperes, and a C/2 rate would be 50 amperes.

Hereinafter, with reference to the attached drawings, embodiments of an electrochemical device and a method of preparing the electrochemical device will be described in further detail.

A negative electrode for a lithium secondary battery may include a negative active material disposed on a current collector; a negative active material layer including a first binder and a conductive agent; and a protective layer disposed on the negative active material layer, the protective layer in direct contact with the current collector and including a nonaqueous second binder or an aqueous second binder, and an inorganic material, wherein, in the protective layer including the aqueous second binder and the inorganic material, the amount of the inorganic material may be about 65 parts by weight or greater based on 100 parts by weight of the total weight of the protective layer, and wherein in the protective layer including the nonaqueous second binder and the inorganic material, the amount of the inorganic material may be in a range of about 5 parts to about 25 parts by weight based on 100 parts by weight of the protective layer.

In the protective layer including the aqueous second binder and the inorganic material, when the amount of the inorganic material is less than 65 parts by weight, an expansion reduction effect of a negative electrode for a lithium secondary battery, and a lithium secondary battery including the same, may be insignificant. In the protective layer, the amount of the inorganic material may be, for example, about 70 parts to about 95 parts by weight based on 100 parts by weight of the protective layer.

In the protective layer including the nonaqueous second binder and the inorganic material, when the amount of the inorganic material is less than 5 parts by weight or greater than 25 parts by weight, it may be difficult to drive (e.g., operate) a lithium secondary battery, or an expansion reduction effect of a negative electrode for a lithium secondary battery and a lithium secondary battery including the same may be insignificant.

In the protective layer including the nonaqueous second binder and the inorganic material, the amount of the inorganic material may be, for example, in a range of about 10 parts to about 20 parts by weight based on 100 parts by weight of the protective layer.

The term "inorganic material" as used herein is construed as including both conductive agents, e.g., graphite, and fillers, e.g., alumina.

Among negative active materials, a silicon-based material has high energy density as compared with a graphite material. However, when a silicon-based material is used as a negative active material, an unstable solid electrolyte interface (SEI) layer may be formed by a side reaction between a silicon surface and an electrolyte, which deteriorates electrochemical characteristics of the negative active material. Also, due to internal stress caused by rapid volume expansion which occurs during a charging and discharging process, the silicon-based material may be pulverized. Thus it would be desirable to have a negative active material that may suppress rapid volume expansion during a charging/discharging process and prevent formation of an SEI layer by suppressing a side reaction between a silicon surface and an electrolyte.

When a negative electrode for a lithium secondary battery includes a silicon-based compound, the silicon-based compound may become detached from the negative electrode due to volume expansion of silicon. This may cause an electrical short in the negative active material, which may lead to a decrease in the lifespan of the lithium secondary battery. To address this problem, a method of preparing a negative active material layer using a high-strength first binder may be used, so as to reduce the expansion of a negative electrode. However, when this method is used to prepare a negative electrode and a lithium secondary battery including the same, the reduction in expansion rate may be insufficient. In order to improve the reduction in expansion rate, a binder included in a negative electrode should be efficiently distributed.

Therefore, the inventors have advantageously discovered that a negative electrode including an additional coating layer (i.e., a protective layer) on a negative active material layer disposed on the negative electrode, absorbs the volume expansion that occurs in the negative electrode during a charging and discharging process. Without being limited by theory, it is believed that the volume expansion is absorbed into pores inside the negative electrode due to the presence of the protective layer on the negative active material layer. In a structure of the negative electrode, a protective layer including a high-strength binder and an inorganic material may remain in direct contact with a current collector while fully surrounding the negative active material layer. In order to efficiently redistribute the binder in the negative electrode, the negative active material layer may include a reduced amount of the binder, and a thin protective layer including the same amount of the binder may be coated on the negative active material layer such that the negative electrode may be efficiently surrounded by the protective layer. Accordingly, expansion of the negative electrode may be sufficiently suppressed. In order to optimize protection and maintenance of a structure of a negative electrode, the amount of an organic material and the amount of an inorganic material in the protective layer may be controlled.

In one or more embodiments, the negative electrode may absorb the expansion of a negative active material, which occurs during a charging and discharging process, within the pores inside of the negative electrode. Accordingly, the structural collapse of the negative electrode due to volume expansion may be prevented in advance, and thus the negative electrode for a lithium secondary battery may have enhanced durability and a decreased expansion rate.

FIG. 1A is a schematic view illustrating a structure of an embodiment of a negative electrode for a lithium secondary battery. In FIG. 1A, silicon 11 is used as a non-limiting negative active material.

Figure 1B:
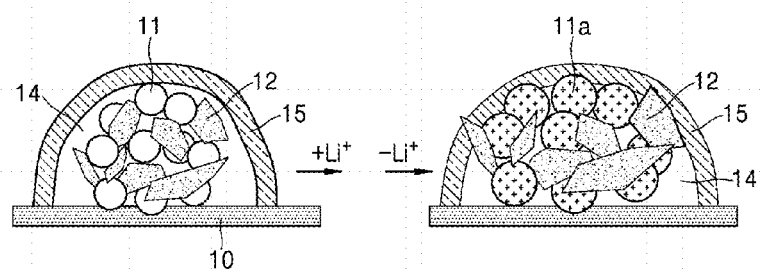
FIG. 1B is a schematic view illustrating a lithiation process in an embodiment of a negative electrode for a lithium secondary battery.

In a negative electrode, a negative active material layer 14 is disposed on a current collector 10. The negative active material layer 14 includes the silicon 11 and graphite 12 as negative active materials. A protective layer 15 on the negative active material layer 14 is in direct contact with the current collector 10 and fully surrounds the negative active material layer 14. When lithiation of a negative electrode occurs, as shown in FIG. 1B, silicon 11 is converted to lithiated silicon 11a, consequently causing expansion of the negative active material. The high-strength protective layer 15 formed on the negative active material layer 14 may prevent the negative electrode from collapsing caused by volume expansion.

In one or more embodiments, a protective layer may include an inorganic material having a surface treated with an organic silane. In this case, the protective layer may include a nonaqueous binder.

The organic silane may be a compound represented by Formula 3.

In Formula 3, each X group may be independently hydrogen, a halogen atom, a $C_1$-$C_{12}$ alkoxy group, a $C_1$-$C_{12}$ acyloxy group, a $C_1$-$C_{12}$ alkylcarbonyl group, a $C_1$-$C_{12}$ alkoxycarbonyl group, or $N(R^2)_2$, wherein each $R^2$ group may be independently hydrogen or a $C_1$-$C_{12}$ alkyl group; each $R^1$ group may be independently a $C_1$-$C_{12}$ alkyl group, a $C_2$-$C_{12}$ alkenyl group, a $C_2$-$C_{12}$ alkynyl group, a $C_6$-$C_{12}$ aryl group, a $C_7$-$C_{12}$ arylalkyl group, a $C_7$-$C_{12}$ alkylaryl group, a $C_8$-$C_{12}$ arylalkenyl group, a $C_8$-$C_{12}$ alkenylaryl group, a $C_8$-$C_{12}$ arylalkynyl group, a $C_8$-$C_{12}$ alkynylaryl group, or a $C_2$-$C_{12}$ alkylcarbonyl group; and m may be an integer from 1 to 3.

The $C_1$-$C_{12}$ alkoxy group, $C_1$-$C_{12}$ acyloxy group, $C_1$-$C_{12}$ alkylcarbonyl group, $C_1$-$C_{12}$ alkoxycarbonyl group, $N(R^2)_2$, $C_1$-$C_{12}$ alkyl group, $C_2$-$C_{12}$ alkenyl group, $C_2$-$C_{12}$ alkynyl group, $C_6$-$C_{12}$ aryl group, $C_7$-$C_{12}$ arylalkyl group, $C_7$-$C_{12}$ alkylaryl group, $C_8$-$C_{12}$ arylalkenyl group, $C_8$-$C_{12}$ alkenylaryl group, $C_8$-$C_{12}$ arylalkynyl group, $C_8$-$C_{12}$ alkynylaryl group, and $C_2$-$C_{12}$ alkylcarbonyl group may be substituted or unsubstituted. The substituent may include an amino group, an amide group, an aldehyde group, a keto group, a carboxy group, a mercapto group, a cyano group, a hydroxyl group, a $C_1$-$C_{12}$ alkoxy group, a $C_3$-$C_{12}$ alkoxyalkoxycarbonyl group, a $C_3$-$C_{12}$ alkoxyalkoxycarbonyl group a sulfonic acid group, a phosphoric acid group, an acryl group, a methacryl group, an epoxy group, a vinyl group, a carbodiimide group, or a combination thereof. More than one group may be present, for example an amino group and an amide group.

The organic silane may include an aminosilane, a mercaptosilane, a (meth)acrylsilane, an epoxysilane, a haloalkyl silane, an iso(thio)cyanate silane, an alcohol-functional silane, a haloaryl silane, a haloalkyl aryl silane, a haloaryl alkyl silane, a carbodiimide silane, an aldehyde-functional silane, a keto-functional silane, an ester-functional silane, an alkoxysilane, or a combination thereof.

In an embodiment, an inorganic material may have a functional group, for example a hydroxyl group, on a surface thereof. The presence of the functional group enables the inorganic material to be readily bound to the organic silane. The silane may further contain a functional group as described above, such that a functional group may be formed on a surface of the inorganic material using the silane compound.

The organic silane may include an aminosilane, e.g., 4-aminobutyl methyl diethoxysilane, 3-aminopropyl trimethoxysilane, or N-2-aminoethyl-3-aminopropyl diethylisopropoxysilane, 2-aminopropyl trimethoxysilane, N-(2-aminoethyl)-3-aminopropyl trimethoxysilane, N-(2-aminoethyl)-3-aminopropyl methyl dimethoxysilane, N-[3-(triethoxysilyl)propyl triethylenetetraamine, N-[3-(trimethoxysilyl)propyl triethylenetetramine, N-[3-(triethoxysilyl)propyl diethylenetriamine, N-[3-(trimethoxysilyl)propyl diethylenetriamine, 10-trimethoxysilyl-1,4,7-triazadecane, 10-triethoxysilyl-1,4,7-triazadecane, N-benzyl-3-aminopropyl trimethoxysilane, N-phenyl-3-aminopropyl trimethoxysilane; a mercaptosilane, e.g., (mercaptomethyl)dimethylethoxysilane, di-4-mercaptobutyl dimethoxysilane, or 3-mercaptopropyl triisopropoxysilane; a (meth)acrylsilane, e.g., γ-methacryloxypropyl trimethoxysilane, 3-methacryloxypropyl dimethylethoxysilane or 3-acryloxypropyl trimethoxysilane; an epoxysilane, e.g., (3-glycidoxypropyl)methyl dimethoxysilane or 2-(3,4-epoxycyclohexyl)ethyl trimethoxysilane; an haloalkyl silane, e.g., 3-chloropropyl trimethoxysilane, 4-bromobutyl methyl dibutoxysilane, or 5-iodohexyl diethylmethoxysilane; an iso(thio)cyanate silane, e.g., 3-isocyanatepropyl trimethoxysilane or 3-isothiocyanatepropylmethyl dimethoxysilane; a hydroxy-functional silane, e.g., 3-hydroxybutyl isopropyl dimethoxysilane, 3-(trimethoxysilyl)propanol, or bis(2-hydroxyethyl)-3-aminopropyl triethoxysilane; a haloaryl silane, e.g., bromophenyl trimethoxysilane; a haloaryl alkyl silane, e.g., (2-(iodophenyl)ethyl)ethyl dimethoxysilane; a haloalkyl aryl silane, e.g., bis(chloromethyl phenyl)dimethoxysilane or bromomethyl phenyl dimethylisopropoxysilane; a carbodiimide silane, e.g., bis(propyl trimethoxysilane)carbodiimide or N-ethyl-N-(propylethoxy dimethoxysilane)-carbodiimide; an aldehyde-functional silane, e.g., 3-(trimethoxysilyl)propanal; an alkoxysilane, e.g., 3-methoxypropyl silane; a keto-functional silane, e.g., (3,5-hexadione)triethoxysilane or, 3-(trimethoxysilyl)propyl acetoacetate; a ureido-functional silane, e.g., 3-ureidopropyl trimethoxysilane, an amido-functional silane, e.g., N-ethoxycarbonyl-3-aminopropyl trimethoxysilane, an ester-functional silane, e.g., 9-trimethoxysilyl-3,6-azononyl acetate, or 3-(trimethoxysilyl)-1-propanol acetate; an anhydride-functional silane, e.g., 3-(triethoxysilyl)propyl succinic acid anhydride; or N-bisoxyethylene-3-aminopropyl trimethoxysilane. A combination comprising at least one of the foregoing may also be used.

In an embodiment, the organic silane may include 3-(triethoxysilyl)propyl succinic acid anhydride, (methacryloxy)propyl trimethoxysilane, and 3-aminopropyl triethoxysilane.

A surface of the inorganic material which has been treated with the organic silane, for example, may include a hydroxy group, an amine group, a urea group, an anhydride group, an acetoacetoxy group, an aldehyde group, a carboxylic acid group, an ester group, or a mercaptan group.

The inorganic material including the organic silane surface treatment may be prepared by mixing a mixture of an inorganic material, the organic silane, and a solvent, followed by hydrolyzing the mixture. After carrying out these processes, a surface of the inorganic material may be modified with the product of hydrolysis and polycondensation of the organic silane. Due to the organic silane surface treatment the binding force between the inorganic material and an organic second binder, e.g., a nonaqueous second binder such as polyvinylidene fluoride or polyfunctional acrylate, may be increased. An —Si—O—Si—OH group having a network structure may be formed on a surface of the inorganic material surface-treated with the organic silane.

Examples of the solvent used in the hydrolysis may include alcohol or distilled water. A catalyst may be added to the hydrolysis.

An amount of the organic silane may be in a range of about 10 parts to about 500 parts by weight, based on 100 parts by weight of the inorganic material. When the amount of the organic silane is within this range, the binding force of the inorganic material to an organic second binder may be significantly increased.

The nonaqueous second binder may include a polyfunctional urethane acrylate, a polyfunctional urethane methacrylate, a polyfunctional acrylate, a polyfunctional methacrylate and a crosslinked product thereof, polyvinylidene fluoride, polyacrylonitrile, polyvinyl chloride, polyvinylpyrrolidone, polytetrafluoroethylene, or a combination thereof.

The polyfunctional urethane acrylate may be a compound having at least two polymerizable functional groups. The number of polymerizable functional groups may be, for example, from 3 to 9. The polyfunctional urethane acrylate may be fully aliphatic, or may have a combination of aliphatic and aromatic groups.

The polyfunctional urethane acrylate may be for example a nine-functional urethane acrylate compound. The nine-functional urethane acrylate compound is commercially available under the trade name MU9800 (an aliphatic urethane multifunctional acrylate, available from Miwon Chemicals Co., Ltd).

The polyfunctional urethane acrylate may be, for example, a compound represented by Formula 1:

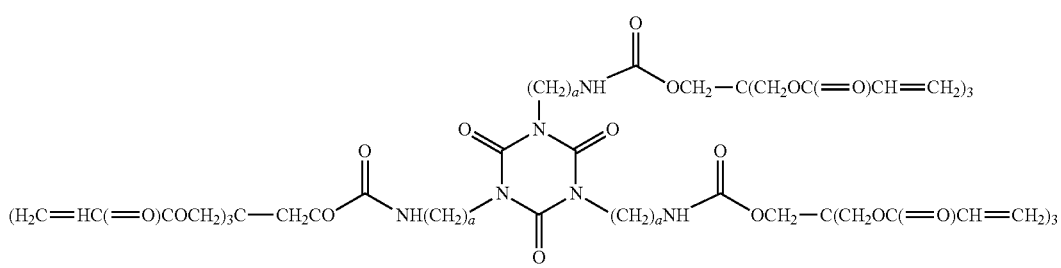

Formula 1 wherein, in Formula 1, a may be an integer from 1 to 15, for example, from 4 to 10, for example, from 6 to 8.

The polyfunctional urethane acrylate may be, for example, a compound represented by Formula 1a:

Formula 1a

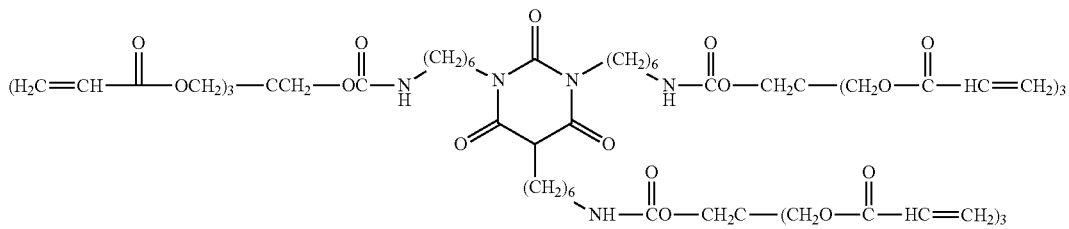

The aqueous second binder may be a copolymer of vinyl acetate and an ethylenically unsaturated carboxylic acid alkali metal-neutralized product.

The ethylenically unsaturated carboxylic acid alkali metal-neutralized product may be an acrylic acid alkali metal-neutralized product or a methacrylic acid alkali metal-neutralized product.

The aqueous second binder may include a vinyl alcohol-sodium acrylate copolymer, a vinyl acetate-potassium acrylate copolymer, a vinyl acetate-potassium methacrylate copolymer, a vinyl acetate-sodium methacrylate copolymer, or a combination thereof.

The vinyl alcohol-sodium acrylate copolymer may be represented by Formula 2:

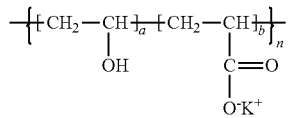

Formula 2 where, in Formula 2, a and b represent a molar amount in each repeating unit, each of a and b may be in a range of about 0.01 to about 0.99 and a sum of a and b is 1, and n is a polymerization degree which may be in a range of about 1 to about 20,000, for example, about 2,000 to about 20,000.

The copolymer represented by Formula 2 may be obtained by reaction of a copolymer of vinyl acetate and acrylic acid represented by Formula 2a and potassium hydroxide:

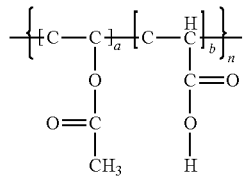

Formula 2a where, in Formula 2a, a and b may each be a molar amount in each repeating unit, each of a and b may be in a range of about 0.01 to about 0.99, and a sum of a and b is 1, and n is a polymerization degree which may be in a range of about 1 to about 20,000, for example, about 2,000 to about 20,000.

In a vinyl alcohol-sodium acrylate copolymer, a molar ratio of a repeating unit of vinyl alcohol to a repeating unit of sodium acrylate in a mixture may be, for example, in a range of about 1:9 to about 9:1, and in some embodiments, about 1:1.

In one or more embodiments, a protective layer may include an aqueous second binder.

The aqueous second binder may include a vinyl alcohol-sodium acrylate copolymer, a vinyl alcohol-potassium acrylate copolymer, a vinyl alcohol-potassium methacrylate copolymer, a vinyl alcohol-sodium methacrylate copolymer, or a combination thereof.

The protective layer may further include a surface-treated inorganic material (i.e., an inorganic material having a surface treatment). The amount of the surface-treated inorganic material may be in a range of about 65 parts to about 95 parts by weight, for example, about 70 parts to about 95 parts by weight, and the amount of the aqueous second binder may be in a range of about 5 parts to about 35 parts by weight, for example, about 5 parts to about 20 parts by weight, based on the total weight of the protective layer.

When a protective layer according to one or more embodiments includes a nonaqueous second binder and an inorganic material, the amount of the inorganic material may be in a range of about 5 parts to about 25 parts by weight, for example, about 10 parts to about 20 parts by weight, based on 100 parts by weight of the protective layer.

The inorganic material of the protective layer may include graphite, carbon black, carbon fibers, carbon nanotubes, acetylene black, Ketjen black, Super P, surface-treated aluminum oxide ($Al_2O_3$), surface-treated silica, zinc oxide, antimony oxide, titanium oxide, zirconium oxide, or a combination thereof.

The inorganic material may be in planar (e.g., plate, flake) form or in spherical particle form. When the inorganic material is in spherical particle form, the diameter of a particle may be in a range of about 1 nanometer (nm) to about 100 nm. When the inorganic material is in planar form, the height of the inorganic material having the plate form may be in a range of about 1 nm to about 10 nm.

A thickness of the protective layer may be in a range of about 1 micrometer (μm) to about 100 μm, for example, about 3 μm to about 15 μm, for example, 5 μm. In one or more embodiments, a ratio of a thickness of a negative active material layer to a thickness of a protective layer in a negative electrode may be in a range of about 10:1 to about 10:3, for example, about 8:1. When the thickness of the protective layer and the ratio of the thickness of the negative active material layer to the thickness of the protective layer are within these ranges, an expansion rate may decrease, which may enable preparation of a negative electrode with enhanced durability.

Figure 2A:
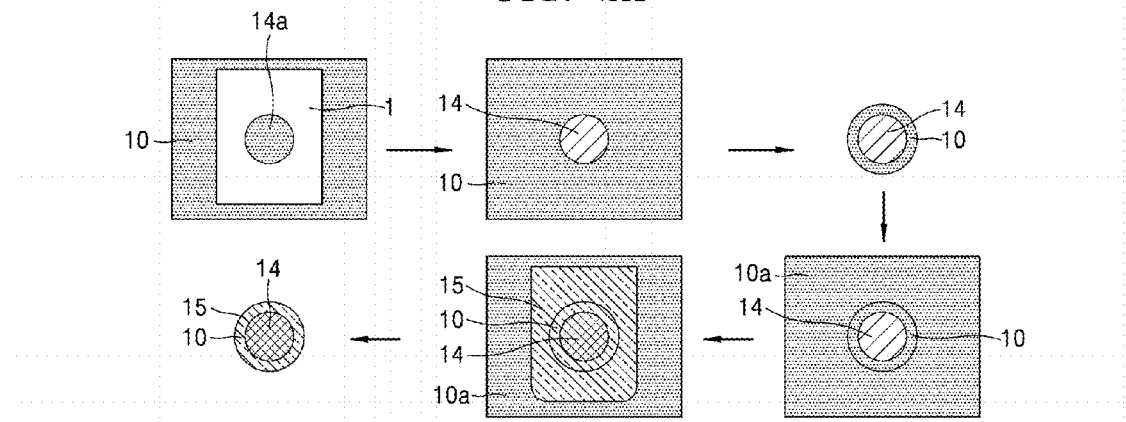
FIG. 2A is a schematic top view illustrating an embodiment of a method of preparing a negative electrode for a lithium secondary battery.
Figure 2B:
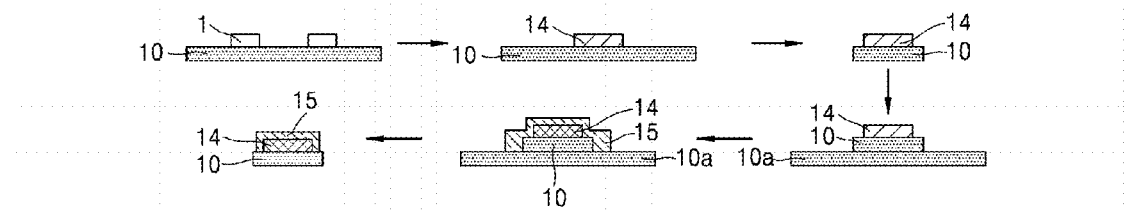
FIG. 2B is a schematic side view illustrating the method of preparing a negative electrode for a lithium secondary battery of FIG. 2A.
Figure 2C:
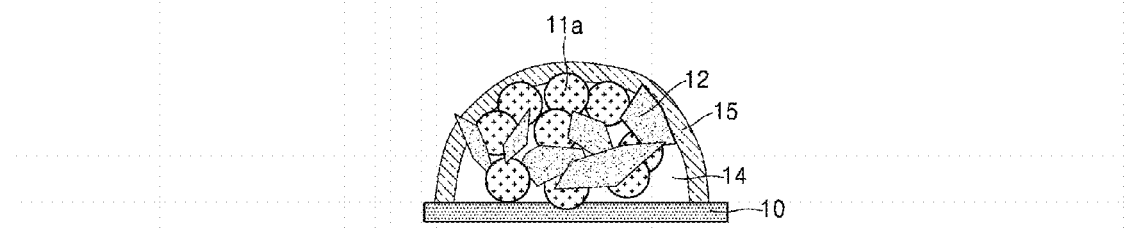
FIG. 2C is a schematic expanded side view of the negative electrode produced by the methods in FIGS. 2A and 2B.

With reference to FIGS. 2A and 2B, a method of manufacturing a negative electrode for a lithium secondary battery will further be described. FIG. 2A is schematic top view illustrating a method of preparing a negative electrode for a lithium secondary battery, FIG. 2B is a schematic side view illustrating the method of preparing a negative electrode for a lithium secondary battery of FIG. 2A, and FIG. 2C is an expanded schematic side view of the negative electrode prepared by the method illustrated in FIGS. 2A and 2B.

First, a punched tape 1 may be disposed on an area of the negative electrode current collector 10, but excluding a negative active material layer forming region 14a. Subsequently, the punched tape 1 may be removed therefrom, and the negative active material layer forming region 14a may be coated with a negative active material layer composition, i.e., a slurry, and dried to form a negative active material layer 14. The area of the negative electrode current collector 10 which may be punched by the punched tape 1, is determined according to the desired size of the negative active material layer 14.

The assembly resulting from the foregoing process may be stacked on a current collector 10a.

Subsequently, a protective layer forming composition may be coated on the stacked assembly, and then the assembly may be dried to form a protective layer 15. The protective layer 15 may be in direct contact with the current collector 10 and fully surround the negative active material layer 14.

A negative active material layer may be formed by coating and drying of a negative active material layer composition. The negative active material layer composition may include a negative active material, a first binder, a conductive agent, and a solvent.

The negative active material may be an active material which undergoes a change in volume due to intercalation of lithium ions, such as a carbonaceous material, silicon, a silicon-based alloy, a silicon-carbonaceous material complex, tin, a tin-based alloy, a tin-carbon complex, aluminum, or a combination thereof.

Examples of the carbonaceous material may include crystalline carbon, amorphous carbon, and mixtures thereof. Examples of the crystalline carbon may include graphite, such as natural graphite or artificial graphite, in shapeless, plate, flake, spherical, or fibrous form. Examples of the amorphous carbon may include soft carbon (carbon sintered at low temperatures), hard carbon, meso-phase pitch carbides, sintered cokes, graphene, carbon black, fullerene soot, carbon nanotubes, and carbon fiber, but embodiments are not limited thereto. Any suitable carbonaceous material available in the art may be used. A combination comprising at least one of the foregoing may also be used.

The negative active material may include Si, Sn, or a silicon-containing metal alloy, or a combination thereof. The silicon-containing metal alloy may aluminum (Al), tin (Sn), silver (Ag), iron (Fe), bismuth (Bi), magnesium (Mg), zinc (Zn), indium (in), germanium (Ge), lead (Pb), titanium (Ti), or a combination thereof.

Examples of the negative active material may include Si, Sn, Al, Ge, Pb, Bi, Sb, a Si—Y alloy (where Y is an alkali metal, an alkaline earth-metal, a Group XIII element, a Group XIV element, a transition metal, a rare-earth element, or a combination thereof, and Y is not Si), a Sn—Y alloy (where Y is an alkali metal, an alkaline earth-metal, a Group XIII element, a Group XIV element, a transition metal, a rare-earth element, or a combination thereof, and Y is not Sn), or a combination thereof. Y may be Mg, calcium (Ca), strontium (Sr), barium (Ba), radium (Ra), scandium (Sc), yttrium (Y), Ti, zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), copper (Cu), Ag, gold (Au), Zn, cadmium (Cd), boron (B), aluminum (Al), gallium (Ga), Sn, In, Tl, Ge, phosphorus (P), arsenic (As), antimony (Sb), Bi, sulfur (S), selenium (Se), tellurium (Te), polonium (Po), or a combination thereof.

In one or more embodiments, a negative active material may include Si, Sn, Al, C, or a combination thereof.

Non-limiting examples of the conductive agent may include carbon black; graphite particulates; natural graphite; artificial graphite; acetylene black; Ketjen black; carbon fibers; carbon nanotubes; metallic materials, such as copper, nickel, aluminum, or silver, in powder, fiber, or tube form; or a conductive polymer, such as a polyphenylene derivative. A combination comprising at least one of the foregoing may also be used. Any suitable conductive agent may be used.

Examples of the first binder may include a vinylidene fluoride/hexafluoropropylene copolymer, polyvinylidene difluoride (PVDF), polyimide, polyethylene, polyester, polyacrylonitrile, polymethylmethacrylate, polytetrafluoroethylene (PTFE), a carboxymethyl cellulose-styrene-butadiene rubber (SMC/SBR) copolymer, a styrene-butadiene rubber polymer, a hydroxypropyl cellulose, a carboxymethyl cellulose, a compound represented by Formula 4, and a combination thereof.

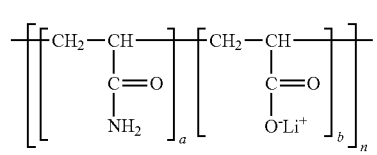

Formula 4

In Formula 4, a and b represent a molar amount of each repeating unit, each of a and b may be in a range of about 0.01 to about 0.99, and a sum of a and b is 1, and n is a polymerization degree which may be in a range of about 1 to about 20,000.

Non-limiting examples of the solvent include N-methyl-pyrrolidone (NMP), acetone, and water.

Any suitable solvent may be used.

A protective layer according to one or more embodiments may include: i) graphite and a vinyl alcohol-sodium acrylate copolymer; or ii) aluminum oxide, polyvinylidene fluoride, and polyfunctional urethane acrylate. The polyfunctional urethane acrylate may be a compound represented by Formula 1a.

In one or more embodiments, a protective layer in a negative electrode may be coated in an amount of about 1 weight percent (wt %) to about 50 wt %, for example, about 1 wt % to about 10 wt %, for example, about 1 wt % to about 5 wt %, based on the total weight of the negative active material layer.

According to an aspect of another embodiment, a lithium secondary battery may include the aforementioned negative electrode.

A positive electrode may be prepared by the following method.

A positive active material, a third binder, and a solvent may be mixed to prepare a positive active material layer composition.

A conductive agent may further be added to the positive active material layer composition.

In one or more embodiments, the positive active material layer composition may be directly coated on a metallic current collector and then dried to prepare a positive electrode plate. In one or more embodiments, the positive active material layer composition may be cast on a separate support to form a positive active material film, which may then be separated from the support and laminated on a metallic current collector to prepare a positive electrode plate.

The positive active material layer composition may include a positive active material suitable for use in a lithium secondary battery.

The positive active material may include lithium cobalt oxide, lithium nickel cobalt manganese oxide, lithium nickel cobalt aluminum oxide, lithium iron phosphorous oxide, lithium manganese oxide, or a combination thereof, but embodiments are not limited thereto. Any suitable positive active material may be used.

Examples of the positive active material may include the compounds represented by the following formulae: $Li_aA_{1-b}B_bD_2$ (wherein $0.90 \leq a \leq 1.8$ and $0 \leq b \leq 0.5$); $Li_aE_{1-b}B_bO_{2-c}D_c$ (wherein $0.90 \leq a \leq 1.8$, $0 \leq b \leq 0.5$, and $0 \leq c \leq 0.05$); $LiE_{2-b}B_bO_{4-c}D_c$ (wherein $0 \leq b \leq 0.5$ and $0 \leq c \leq 0.05$); $Li_aNi_{1-b-c}Co_bB_cD_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Co_bB_cO_{2-\alpha}F_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Co_bB_cO_{2-\alpha}F_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB_cD_\alpha$ (wherein $0.90 \leq a \leq 1.8$, $0b \leq 0.5$, $0 \leq c \leq 0.05$, and $0 < \alpha \leq 2$); $Li_aNi_{1-b-c}Mn_bB_cO_{2-\alpha}F_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB_cO_{2-\alpha}F_\alpha$ (wherein $0.90 \leq a \leq 0.5$, $0 \leq b \leq 0.5$, $0 \leq c \leq 0.05$, and $0 < \alpha < 2$); $Li_aNi_bE_cG_dO_2$ (wherein $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (wherein $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1.8$, and $0.001 \leq b \leq 0.1$); $Li_aCoG_bO_2$ (wherein $0.90 \leq a \leq 1.8$ and $0.001 \leq b \leq 0.1$); $Li_aMnG_bO_2$ (wherein $0.90 \leq a \leq 1.8$ and $0.001 \leq b \leq 0.1$); $Li_aMn_2G_bO_4$ (wherein $0.90 \leq a \leq 1.8$ and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); or $LiFePO_4$. A combination comprising at least one of the foregoing may also be used.

In the formulae above, A may include nickel (Ni), cobalt (Co), manganese (Mn), or a combination thereof; B may include aluminum (Al), Ni, Co, Mn, chromium (Cr), iron (Fe), magnesium (Mg), strontium (Sr), vanadium (V), a rare-earth element, or a combination thereof; D may include oxygen (O), fluorine (F), sulfur (S), phosphorus (P), or a combination thereof; E may include Co, Mn, or a combination thereof; F may include F, S, P, or a combination thereof; G may include Al, Cr, Mn, Fe, Mg, lanthanum (La), cerium (Ce), Sr, V, or a combination thereof; Q may include titanium (Ti), molybdenum (Mo), Mn, or a combination thereof; I may include Cr, V, Fe, scandium (Sc), yttrium (Y), or a combination thereof; and J may include V, Cr, Mn, Co, Ni, copper (Cu), or a combination thereof.

The conductive agent, the third binder, and the solvent may be the same as those used in the preparation of a negative electrode.

The amounts of the positive active material, the conductive agent, the binder, and the solvent are not limited and may be determined by a person of skill in the art without undue experimentation. At least one of the conductive agent, the binder, and the solvent may be omitted depending on the use and the structure of the lithium secondary battery.

The negative electrode according to one or more embodiments may be used as a negative electrode in a lithium secondary battery.

The amounts of the negative active material, the conductive agent, the first binder, and the solvent are not limited and may be determined by a person of skill in the art without undue experimentation.

A separator may be disposed between the positive electrode and the negative electrode. A thin film having excellent ion permeability, mechanical strength, and insulating properties may be used as a separator.

The pore diameter of the separator may be, in general, in a range of about 0.01 μm to about 10 μm, and the thickness of the separator may be, in general, in a range of about 5 μm to about 20 μm. Examples of the separator may include an olefin-based polymer, e.g., polypropylene, or a sheet or non-woven fabric formed of glass fiber or polyethylene. When a solid polymer electrolyte is used as an electrolyte, the solid polymer electrolyte may also serve as a separator.

Examples of the olefin-based polymers for the separator may include a single layer of polyethylene, polypropylene, or PVDF, or a multilayer film of two or more layers thereof, such as a mixed multilayer film, e.g., a polyethylene/polypropylene two-layered separator, a polyethylene/polypropylene/polyethylene three-layered separator, and a polypropylene/polyethylene/polypropylene three-layered separator.

When a nonaqueous electrolyte containing a lithium salt is used as an electrolyte, the nonaqueous electrolyte containing a lithium salt may include a nonaqueous electrolyte and a lithium salt.

Examples of the nonaqueous electrolyte may include a nonaqueous electrolyte solution, an organic solid electrolyte, and an inorganic solid electrolyte.

An example of the nonaqueous electrolyte solution may be an organic solvent. Any suitable organic solvent may be used. For example, the organic solvent may include propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, fluoroethylene carbonate, benzonitrile, acetonitrile, tetrahydrofuran, 2-methyl tetrahydrofuran, γ-butyrolactone, dioxolan, 4-methyl dioxolan, N, N-dimethylformamide, N,N-dimethylacetamide, N,N-dimethylsulfoxide, dioxane, 1,2-dimethoxyethane, sulfolane, dichloroethane, chlorobenzene, nitrobenzene, diethylene glycol, dimethyl ether, or a combination thereof.

Examples of the organic solid electrolyte may include a polyethylene derivative, a polyethylene oxide derivative, a polypropylene oxide derivative, a phosphoric acid ester polymer, poly (-lysine), polyester sulfide, a polyvinyl alcohol, PVDF, a polymer including a dissociable ionic group, or a combination thereof.

The inorganic solid electrolyte may be, for example, $Li_3N$, $LiI$, $Li_5NI_2$, $Li_3N$—$LiI$—$LiOH$, $Li_2SiS_3$, $Li_4SiO_4$, $Li_4SiO_4$—$LiI$—$LiOH$, or $Li_3PO_4$—$Li_2S$—$SiS_2$.

The lithium salt may be a material easily dissolved in the non-aqueous electrolyte, for example, $LiPF_6$, $LiBF_4$, $LiSbF_6$, $LiAsF_6$, $LiClO_4$, $LiCF_3SO_3$, $Li(CF_3SO_2)_2N$, $Li(FSO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are natural numbers), $LiCl$, $LiI$, or a combination thereof. In addition, in consideration of improvement in charge and discharge characteristics and flame retardancy, the nonaqueous electrolyte may further include pyridine, triethyl phosphate, triethanolamine, cyclic ether, ethylenediamine, n-glyme, hexamethyl phosphoramide, a nitrobenzene derivative, sulfur, a quinoneimine-dye, N-substituted oxazolidinone, N, N-substituted imidazolidine, ethylene glycol dialkyl ether, ammonium, pyrrole, 2-methoxyethanol, trichloroaluminum, or a combination thereof. In some embodiments, in consideration of non-combustibility, the nonaqueous electrolyte may further include a halogen-containing solvent, such as carbon tetrachloride or trifluoroethylene.

Figure 3:
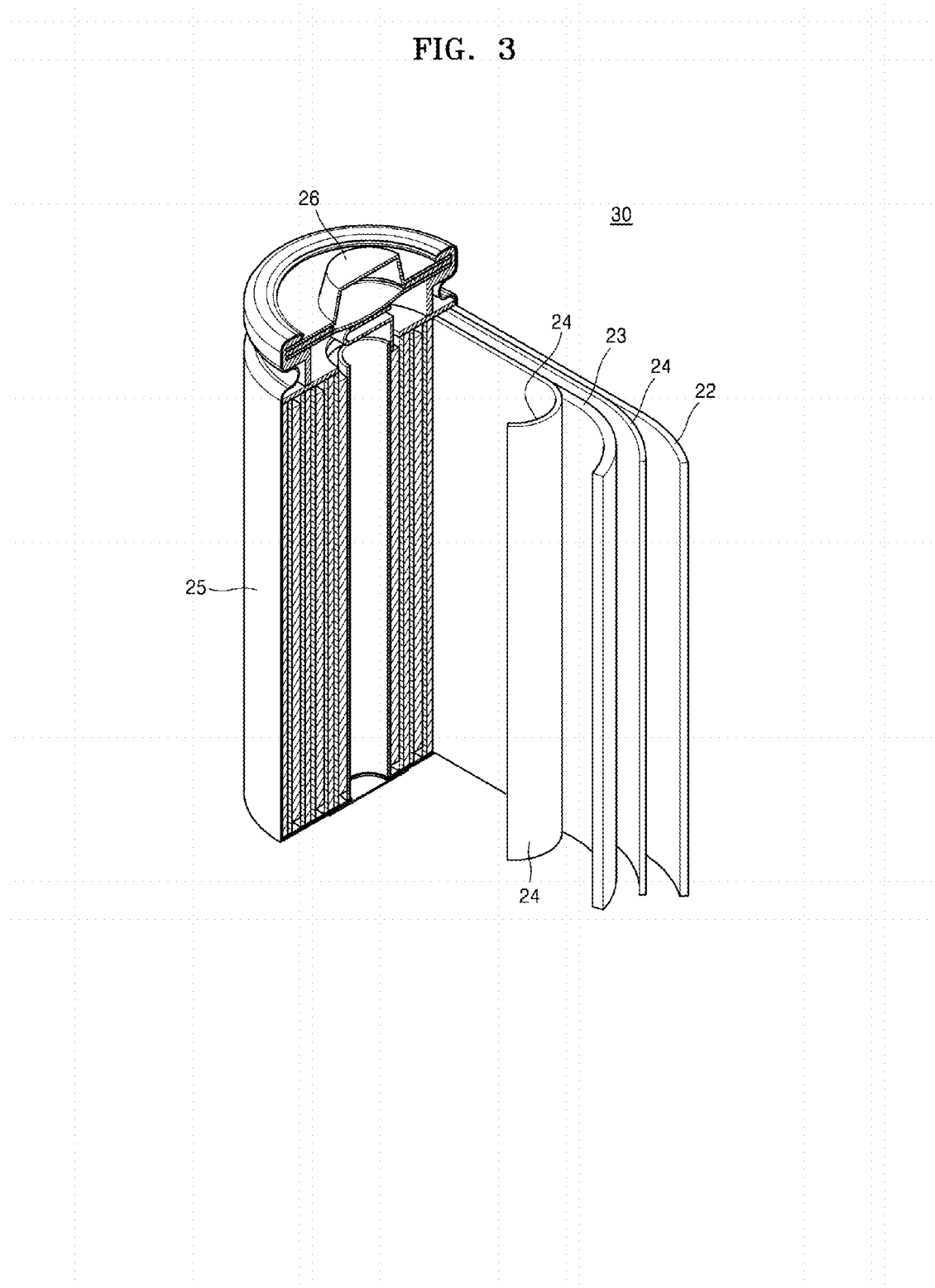
FIG. 3 is a schematic view illustrating an embodiment of a structure of a lithium secondary battery.

As shown in FIG. 3, a lithium secondary battery 21 includes a positive electrode 23, a negative electrode 22, and a separator 24. The positive electrode 23, the negative electrode 22, and the separator 24 may be wound or folded, and then sealed in a battery case 25. The battery case 25 may then be filled with an organic electrolyte solution and sealed with a cap assembly 26, thereby completing the manufacture of the lithium secondary battery 21. The battery case 5 may be a cylindrical type, a rectangular type, or a thin-film type. For example, the lithium secondary battery 21 may be a thin-film type battery. In one or more embodiments, the lithium secondary battery 21 may be a lithium ion battery.

In one or more embodiments, the separator 24 may be disposed between the positive electrode 23 and the negative electrode 22 to provide a battery assembly. In one or more embodiments, the battery assembly may be stacked in a bi-cell structure and impregnated with the organic electrolyte solution. In one or more embodiments, the resultant assembly may be put into a pouch and hermetically sealed, thereby completing the manufacture of a lithium ion polymer battery.

In one or more embodiments, a plurality of battery assemblies may be stacked to form a battery pack, which may be used in a device that utilizes large capacity and high power, for example, in a laptop computer, a smartphone, or an electric vehicle.

The lithium secondary battery 21 may be suitable for use in an electric vehicle (EV), for example, in a hybrid vehicle, such as a plug-in hybrid electric vehicle (PHEV).

Hereinafter embodiments will be described in detail with reference to Examples and Comparative Examples. These examples are for illustrative purposes only and are not intended to limit the scope of the inventive concept.

EXAMPLES

Preparation Example 1: Preparation of a Copolymer of Vinyl Alcohol and Sodium Acrylate 1) Synthesis of Copolymer of Vinyl Ester and Ethylenically Unsaturated Carboxylic Acid Ester To a reactor with a capacity of 2 liters (L) having a stirrer, a thermometer, an $N_2$ gas inlet pipe, a reflux condenser, and a dripping funnel, 768 g of water and 12 g of anhydrous sodium sulfate were added, and then, the reactor was charged with $N_2$ gas to remove oxygen therefrom. Subsequently, 1 gram (g) of partially saponified polyvinyl alcohol (a degree of saponification of 88%) and 1 g of lauryl peroxide were added to the reactor. Then, the internal temperature of the reactor was raised to a temperature of 60° C., followed by dripping of 104 g (1.209 mol) of methyl acrylate and 155 g (1.802 mol) of vinyl acetate by using the dripping funnel for 4 hours. The internal temperature of 65° C. was maintained for 2 hours to complete the reaction. Thereafter, a solid was filtrated and separated, thereby obtaining 288 g of a copolymer (water content: 10 wt %) of vinyl acetate and methyl acrylate. The obtained copolymer was dissolved in N, N-dimethyl formamide (DMF) and a filtration process was performed thereon.

2) Synthesis of Copolymer of Vinyl Alcohol and Ethylenically Unsaturated Carboxylic Acid Alkali Metal-Neutralized Product.

To a reactor substantially the same as the aforementioned reactor, 450 g of methanol, 420 g of water, 132 g (3.3 mol) of sodium hydroxide, and 288 g (water content: 10.4 wt %) of the water-containing copolymer were added, followed by saponification by stirring at a temperature of 30° C. for 3 hours. Once the saponification was complete, the obtained copolymer saponification product was washed with methanol, filtered, and dried at a temperature of 70° C. for 6 hours, thereby obtaining 193 g of a saponification product of the copolymer of vinyl acetate and methyl acrylate (copolymer of vinyl alcohol and sodium acrylate). The weight-average particle diameter of the saponification product of the copolymer of vinyl acetate and methyl acrylate (copolymer of vinyl alcohol and sodium acrylate) was 180 µm.

3) Pulverization of Copolymer of Vinyl Alcohol and Sodium Acrylate 193 g of the copolymer of vinyl alcohol and sodium acrylate was pulverized using a jet mill (LJ available from Nippon Pneumatic Mfg. Co., Ltd.), thereby obtaining 173 g of the copolymer of vinyl alcohol and sodium acrylate in a micropowder phase. The diameter of the obtained copolymer of vinyl alcohol and sodium acrylate was measured using a laser diffraction particle size distribution analyzer (SALD—7200 available from Shimadzu Corporation), and the obtained volume-average particle diameter was converted to a weight-average particle diameter. The weight-average particle diameter of the copolymer was 44 µm.

Example 1: Preparation of Coin Half-Cell

First, a punched tape was placed on an area of a copper foil excluding a negative active material layer forming region thereof, and then a negative active material layer composition was bar-coated with a doctor blade, to a thickness of 15 µm, on the negative active material layer forming region on the copper foil. The resultant coating was dried at a temperature of 80° C., thereby forming a negative active material layer having a thickness of 40 µm. The copper foil was punched at a size corresponding to the size of the negative active material layer.

Aside from the aforementioned process, the assembly obtained by the process was stacked on a copper foil, coated with a protective layer forming composition using a doctor blade, and dried at a temperature of 80° C., thereby manufacturing a negative electrode, in which a protective layer having a thickness of 5 µm was in direct contact with the copper foil and fully surrounded the negative active material layer. The ratio of a thickness of the negative active material layer to a thickness of the protective layer was about 8:1.

Lithium metal was used as a counter electrode of the negative electrode, thereby completing the manufacture of a coin half-cell (CR2032 type).

As an electrolyte, 1.3 M $LiPF_6$ ethylene carbonate (EC), diethylene carbonate (DEC), and fluoroethylene carbonate (FEC) (at a volume ratio of 2:6:2) were used, and a polypropylene separator (CELGARD® 3501) was used as a separator.

The negative active material layer composition was prepared by mixing, with an NMP solution, a silicon/graphite complex (Gen2) and graphite (MC20&SFG6) as a negative active material, Ketjen black as a conductive agent, and a SMC/SBR copolymer (a molar ratio of carboxymethyl cellulose to styrene-butadiene rubber of 1:1) as a first binder at a weight ratio of 96:1:3 in an agate mortar. Gen2 is available from BTR Co., Ltd, which is an active material in which Si particles having an average particle diameter of about 150 nm are present on and in graphite.

The protective layer forming composition was prepared by mixing 70 parts by weight of graphite (available from Shan Tech Co., Ltd) and 30 parts by weight of the copolymer of vinyl alcohol and sodium acrylate prepared in Preparation Example 1 with 570 parts by weight of deionized water as a solvent. In the copolymer of vinyl alcohol and sodium acrylate, the molar ratio of vinyl alcohol to sodium acrylate was 5:5, and the weight-average molecular weight of the copolymer was 400,000.

Examples 2 and 3: Preparation of Coin Half-Cells

Coin half-cells were manufactured in the same manner as in Example 1, except that 95 parts by weight of graphite and 5 parts by weight of the copolymer of vinyl alcohol and sodium acrylate were used in the protective layer forming composition.

Example 4: Preparation of Coin Half-Cell

First, a punched tape was placed on an area of a copper foil excluding a negative active material layer forming region thereof, and then a negative active material layer composition was bar-coated using a doctor blade, to thickness of 15 μm, on the negative active material layer forming region on the copper foil. The resultant coating was dried at a temperature of 80° C., thereby forming a negative active material layer. The copper foil was punched at a size corresponding to the size of the negative active material layer.

Aside from the aforementioned process, the assembly obtained by the process was stacked on a copper foil, the assembly was coated with a protective layer forming composition using a doctor blade and dried at a temperature of 80° C., thereby manufacturing a negative electrode, in which a protective layer having a thickness of 5 μm was in direct contact with the copper foil and fully surrounded the negative active material layer.

Lithium metal was used as a counter electrode of the negative electrode, thereby completing the manufacture of a coin half-cell (CR2032 type).

As an electrolyte, 1.3 molar (M) $LiPF_6$ EC, DEC, and FEC (at a volume ratio of 2:6:2) were used, and a polypropylene separator (CELGARD® 3501) was used as a separator.

The negative active material layer composition was prepared by mixing, with a silicon/graphite complex (Gen2) and graphite (MC20&SFG6) as a negative active material, Ketjen black as a conductive agent, and a NMP solution of SMC/SBR copolymer as a first binder. Here, a weight ratio of the negative active material, conductive agent, and the binder was 96:1:3, mixed in an agate mortar.

The protective layer forming composition was prepared by mixing aluminum oxide ($Al_2O_3$) surface-treated with acrylsilane, polyvinylidene fluoride, and MU9800 (an aliphatic urethane multifunctional acrylate available from Miwon Chemicals Co., Ltd) with N,N-dimethylacetamide as a solvent. The amount of aluminum oxide ($Al_2O_3$) surface-treated with acrylsilane was 15 parts by weight, and the total amount of polyvinylidene fluoride and MU9800 was 85 parts by weight. The weight ratio of polyvinylidene fluoride to MU9800 was 1:1.

The aluminum oxide ($Al_2O_3$) surface-treated with acrylsilane was prepared by pulverizing 25 wt % of $Al_2O_3$ having an average particle diameter of about 1 μm and 0.25 wt % γ-methacryloxypropyltrimethoxysilane (KBM503, available from Shin-Etsu Chemical Co., Ltd., Japan) as acryl silane in 75 wt % of acetone using a bead mill at a temperature of 25° C. for 2 hours, thereby obtaining a dispersion including surface-treated particles having an average particle diameter of 450 nm.

Examples 5 and 6: Preparation of Coin Half-Cells

Coin half-cells of Examples 5 and 6 were manufactured in the same manner as in Example 4, except that 5 parts by weight and 25 parts by weight of aluminum oxide ($Al_2O_3$) surface-treated with acrylsilane were respectively used to form the protective layer forming composition.

Example 7: Preparation of Coin Half-Cell

A coin half-cell of Example 7 was manufactured in the same manner as in Example 4, except that the negative active material layer composition was prepared by mixing, a silicon/graphite complex (Gen2) and graphite (MC20&SFG6) as a negative active material, Ketjen black as a conductive agent, and a NMP solution of AST9005 (available from Aekyung Chemical Co., Ltd) as a first binder. Here, a weight ratio of the negative active material, conductive agent, and the first binder was 91:1:8 in an agate mortar.

Examples 8 and 9: Preparation of Coin Half-Cells

Coin half-cells of Examples 8 and 9 were manufactured in the same manner as in Example 1, except that the ratios of the thickness of the negative active material layer to the thickness of the protective layer were about 10:1 and about 10:3, respectively.

Comparative Example 1: Preparation of Coin Half-Cell

A coin half-cell was manufactured in substantially the same manner as in Example 1, except that a protective layer was not formed on a copper foil and a negative active material layer.

Comparative Example 2: Preparation of Coin Half-Cell

A coin half-cell was manufactured in substantially the same manner as in Example 1, except that the protective layer forming composition was prepared by mixing 50 parts by weight of graphite (available from Shan Tech Co., Ltd) and 50 parts by weight of a copolymer of vinyl alcohol and sodium acrylate with 950 parts by weight of deionized water as a solvent.

Comparative Example 3: Preparation of Coin Half-Cell

A coin half-cell was manufactured in substantially the same manner as in Example 4, except that the amount of aluminum oxide ($Al_2O_3$) surface-treated with acrylsilane was 50 parts by weight, and the total amount of polyvinylidene fluoride and MU9800 was 50 parts by weight.

Comparative Example 4: Preparation of Coin Half-Cell

A coin half-cell was manufactured in substantially the same manner as in Example 1, except that the protective layer forming composition was prepared by mixing 5 parts by weight of a copolymer of vinyl alcohol and sodium acrylate with 95 parts by weight of deionized water as a solvent.

Comparative Example 5: Preparation of Coin Half-Cell

A coin half-cell was manufactured in substantially the same manner as in Example 4, except that the protective layer forming composition was prepared by mixing 10 parts by weight of polyvinylidene fluoride and 10 parts by weight of MU9800 (an aliphatic multifunctional urethane acrylate available from Miwon chemicals Co., Ltd) with 80 parts by weight of N,N-dimethylacetamide as a solvent.

volts (V). Then, the each of the coin half-cells was discharged with a C-rate of 1 C until the voltage reached 1.5 V. Thereafter, each of the coin half-cells was rested for about 10 minutes. Then, at the second and the following cycles ($n \geq 2$), each of the coin half-cells was charged with a C-rate of 0.1 C at ambient temperature (25° C.) until the voltage reached 0.01 V, followed by discharging with a C-rate of 0.1 C or 0.2 C until the voltage reached 1.5 V. This cycle of charging and discharging was repeated until the $100^{th}$ cycle (i.e., n=100).

The initial efficiency of the coin half-cells of Examples 1 and 2 and Comparative Example 4 was determined according to Equation 1. The evaluation results of the initial efficiency of each of the coin half-cells are shown in Table 1.

Initial efficiency (%)=(discharge capacity at the $1^{st}$ cycle/charge capacity at the $1^{st}$ cycle)×100%     Equation 1

The mixture density, current density, content, and volume capacity of the negative active material in the negative active material layer are also shown in Table 1.

TABLE 1

| Cell name | I.C.E. 0.1 C | Charge capacity (mAh) 0.1 C | Discharge capacity (mAh) 0.1 C | 0.2 C | L/L (mg/cm$^2$) | Mixture density (g/cc) | Current density (A/m$^2$) | Active material content (wt %) | Volume capacity (mAh/cc) |
|---|---|---|---|---|---|---|---|---|---|
| Example 1 H1 | 87.6 | 570 | 500 | 516 | 5.16 | 1.72 | 2.40 | 90 | 799 |
| H2 | 83.3% | 477 | 398 | 430 | 4.95 | 1.65 | 1.91 | 90 | 638 |
| H3 | 88.1% | 585 | 516 | 537 | 4.50 | 1.55 | 2.18 | 90 | 750 |
| Example 2 H4 | 88.4% | 564 | 499 | 517 | 4.61 | 1.65 | 2.22 | 93 | 792 |
| H5 | 88.9% | 591 | 525 | 546 | 4.67 | 1.61 | 2.37 | 93 | 817 |
| H6 | 87.9% | 566 | 498 | 518 | 4.44 | 1.53 | 2.14 | 93 | 737 |

Evaluation Example 1: Scanning Electron Microscope (SEM) Analysis

SEM analysis was performed on the negative electrodes manufactured in Example 1 and Comparative Example 1. S-5500 (available from Hitachi Co., Ltd) was used for the SEM analysis.

Figure 4A:
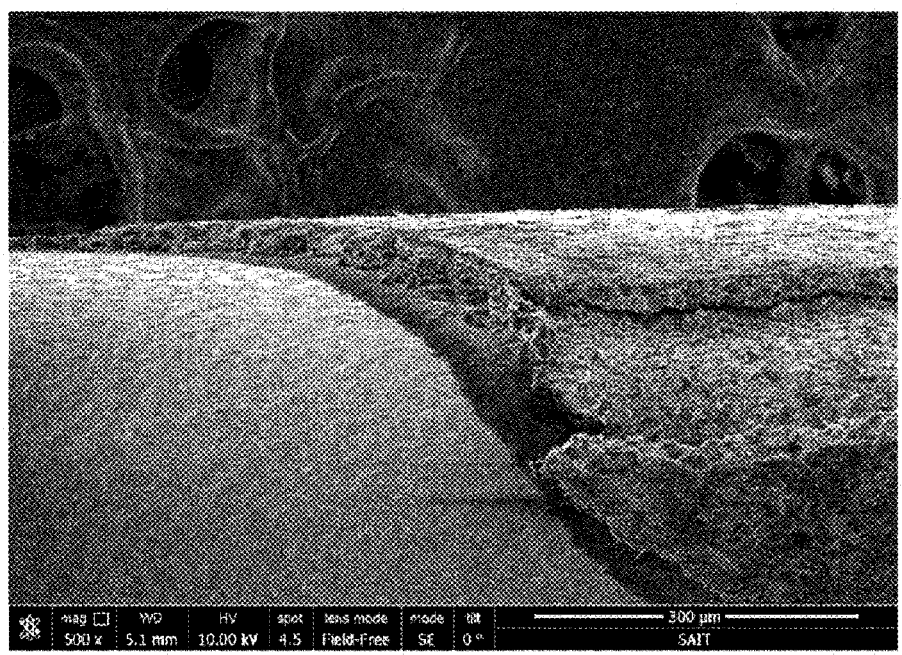
FIGS. 4A to 4C are each a scanning electron microscope (SEM) image of the negative electrode of Example 1.
Figure 4B:
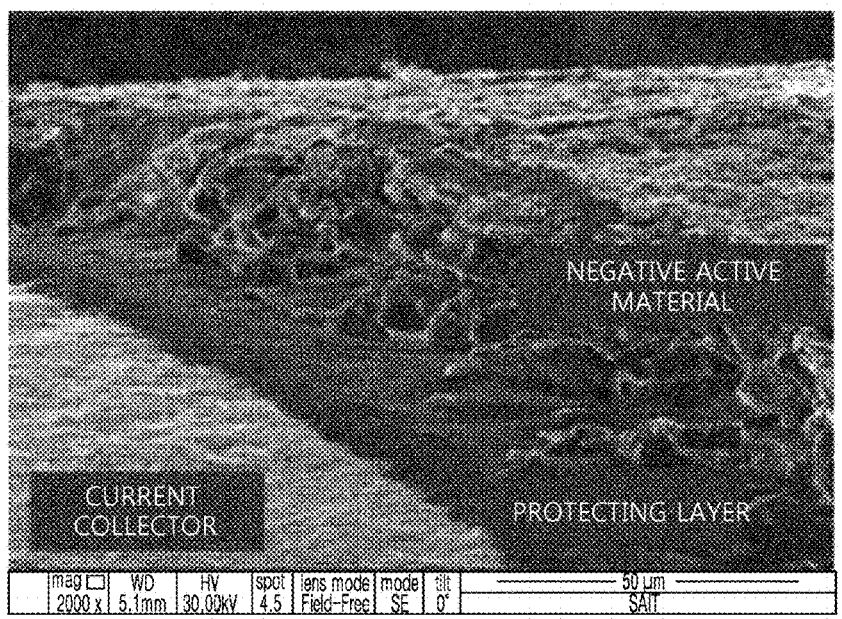
Figure 4C:
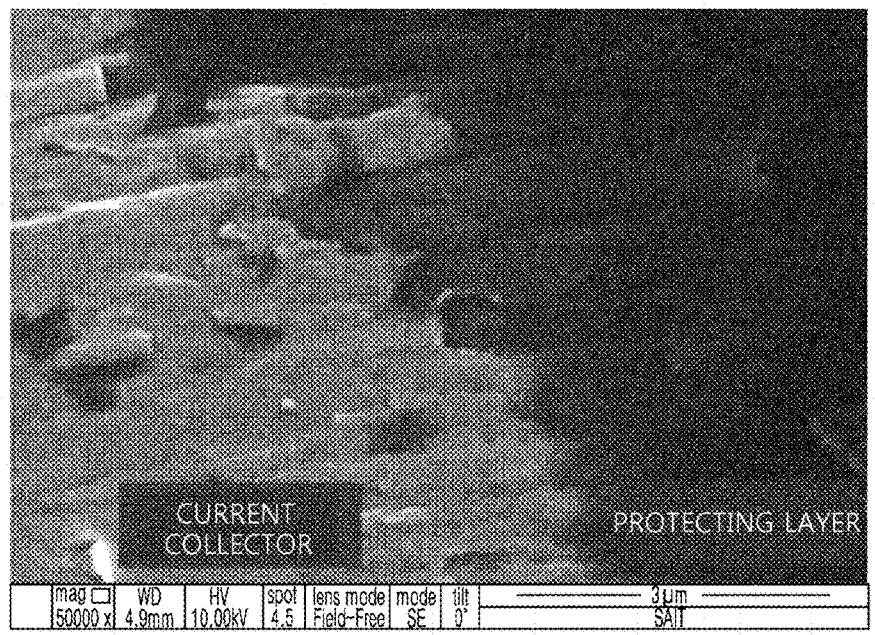
Figure 4D:
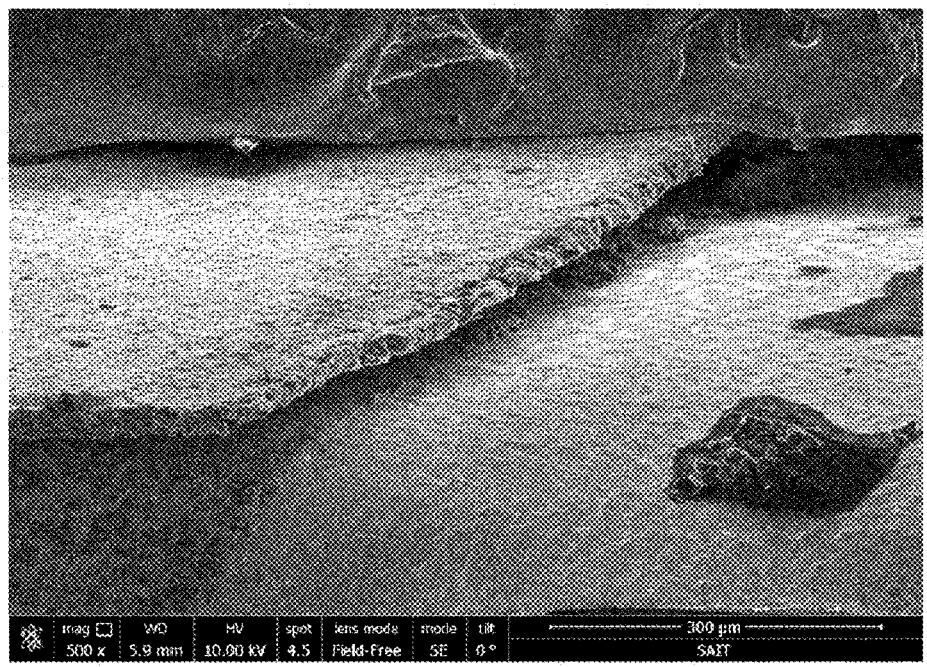
FIGS. 4D to 4F are each an SEM image of a negative electrode of Comparative Example 1.
Figure 4E:
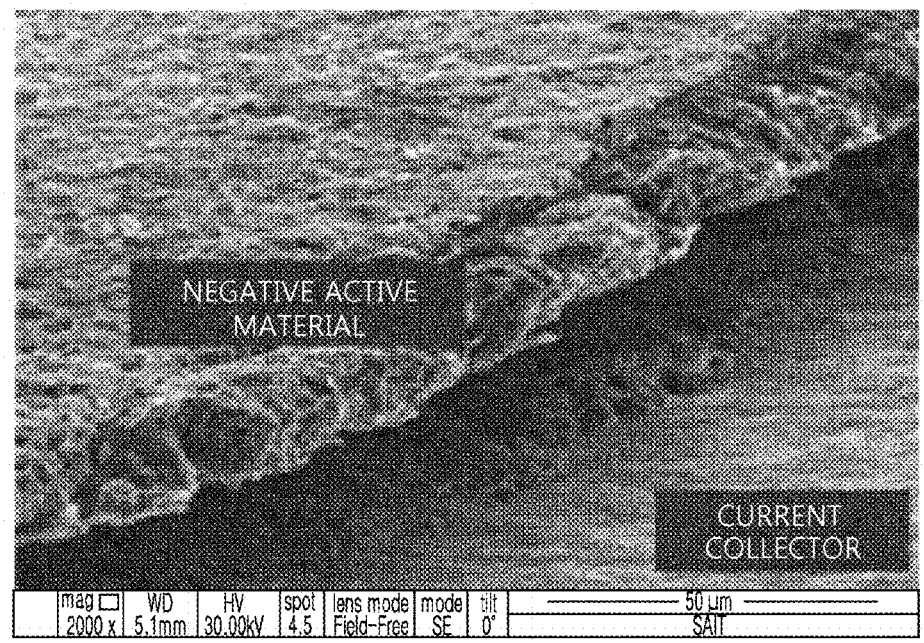
Figure 4F:
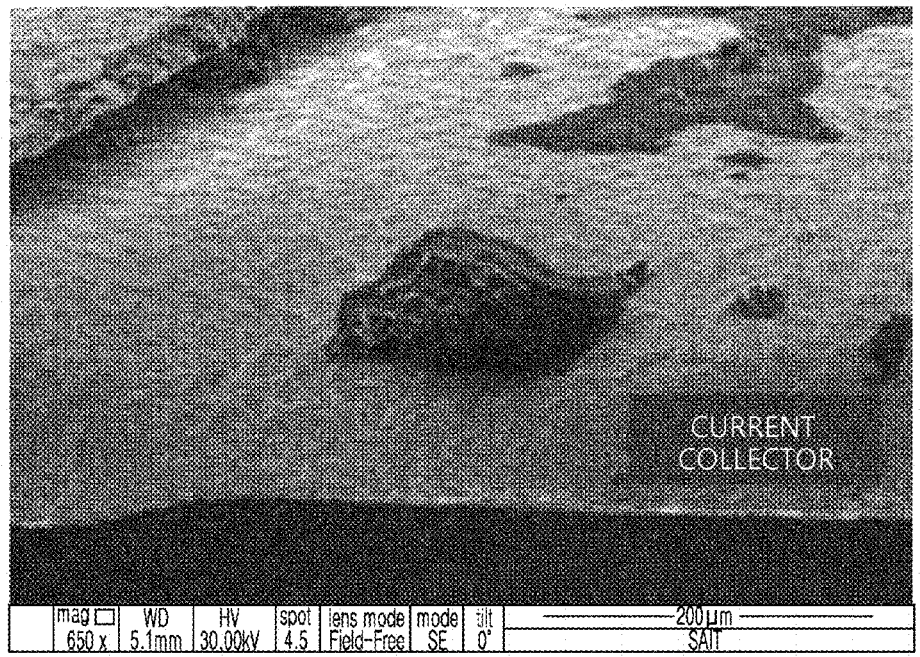

SEM analysis results are shown in FIGS. 4A to 4F. FIGS. 4A to 4C are each an SEM image of the negative electrode of Example 1, and FIGS. 4D to 4F are each an SEM image of the negative electrode of Comparative Example 1.

Referring to FIGS. 4A to 4F, when an external force was applied to the negative electrode of Comparative Example 1, a portion of the negative active material layer was uplifted, whereas in the negative electrode of Example 1, no such phenomenon was observed.

Evaluation Example 2: Charging and Discharging Characteristics

1) Examples 1 and 2 and Comparative Example 4

The charging and discharging characteristics of the coin half-cells manufactured in Examples 1 and 2 and Comparative Example 4 were evaluated by using a charger and discharger (TOYO-3100, available from: TOYO SYSTEM Co., Ltd.). In detail, at the first cycle (n=1), each of the coin half-cells was charged with a C-rate of 1 C (unit: mA/g) at ambient temperature (25° C.) until the voltage reached 0.01

In Table 1, "L/L" indicates the loading level of a negative electrode.

As shown in Table 1, the initial efficiency, capacity characteristics, mixture density characteristics, and current density characteristics of the coin half-cells manufactured in Examples 1 and 2 were all excellent.

On the contrary, the coin half-cell manufactured in Comparative Example 4 did not exhibit capacity.

In addition, the charging and discharging characteristics of the coin half-cells manufactured in Examples 8 and 9 were evaluated in substantially the same manner as in the evaluation of the coin half-cells of Examples 1 and 2 and Comparative Example 4.

As a result, the coin half-cells of Examples 8 and 9 also exhibited charging and discharging characteristics substantially the same as those of the coin half-cell of Example 1.

2) Example 7 and Comparative Example 5

The charging and discharging characteristics of the coin half-cells manufactured in Example 7 and Comparative Example 5 were evaluated in substantially the same manner as in the evaluation of the coin half-cells of Examples 1 and 2 and Comparative Example 4. The evaluation results are shown in Table 2.

TABLE 2

| Cell name | I.C.E. 0.1 C | Charge capacity (mAh) 0.1 C | Discharge capacity (mAh) 0.1 C | 0.2 C | L/L (mg/cm²) | Mixture density (g/cc) | Current density (A/m²) | Active material content (wt %) | Volume capacity (mAh/cc) |
|---|---|---|---|---|---|---|---|---|---|
| H1 | 81.7 | 670 | 547 | 578 | 5.23 | 1.59 | 2.69 | 89.0 | 815 |
| H2 | 81.1% | 658 | 533 | 561 | 5.24 | 1.59 | 2.62 | 89.0 | 793 |
| H3 | 83.6% | 733 | 613 | 629 | 5.10 | 1.55 | 2.85 | 89.0 | 865 |

Referring to Table 2, the coin half-cell of Example 7 was found to have excellent volume capacity, discharge capacity, mixture density characteristics, and current density characteristics.

In contrast, the coin half-cell of Comparative Example 5 having a protective layer not containing aluminum oxide did not exhibit capacity characteristics.

Evaluation Example 3: Expansion Rate

1) Examples 1 and 2 and Comparative Example 4

The coin half-cells manufactured in Example 1 and Comparative Example 4 were fully charged with a C-rate of 0.2 C. Then, a rate of change of a battery thickness was measured to evaluate the expansion rate. The measurement results are shown in FIG. 5.

Figure 5:
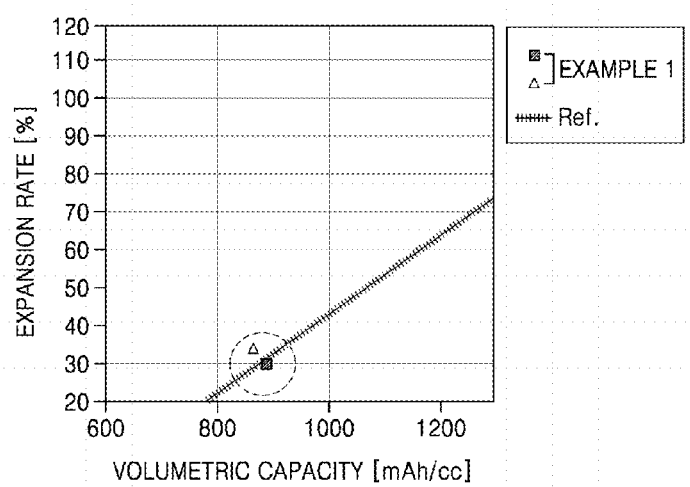
FIG. 5 is a graph of expansion rate (percent, %) versus volumetric capacity (milliampere-hours per cubic centimeter, mAh/cc), showing changes in expansion rate for coin half-cells according to Example 1.

Referring to FIG. 5, the coin half-cell of Example 1 exhibited reduction in expansion.

In contrast, the coin half-cell having a protective layer which did not contain graphite as an inorganic material (Comparative Example 4) was not driven, and thus did not exhibit capacity characteristics.

In addition, the expansion rates of the coin half-cells of Examples 8 and 9 were evaluated in substantially the same manner as in the evaluation of the coin half-cells of Examples 1 and 2 and Comparative Example 4.

As a result, the coin half-cells of Examples 8 and 9 also exhibited expansion rate characteristics substantially the same as those of the coin half-cell of Example 1.

2) Example 7 and Comparative Example 1

The coin half-cells of Example 7 and Comparative Example 1 were fully charged with a C-rate of 0.2 C. Then, a rate of change of a battery thickness was measured to evaluate the expansion rate. The measurement results are shown in FIG. 6.

Figure 6:
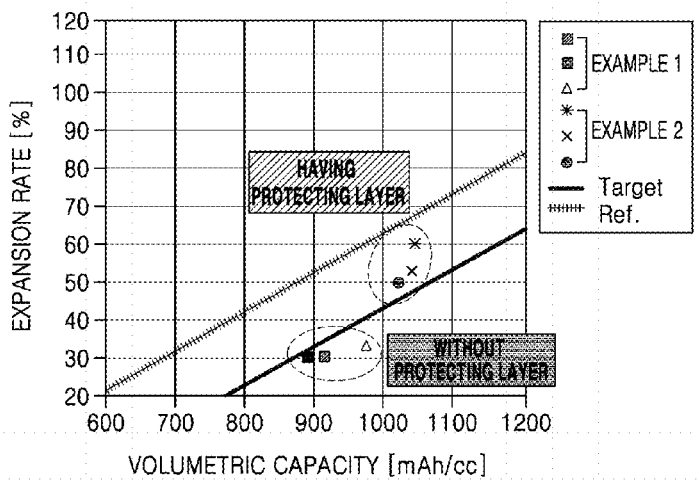
FIG. 6 is a graph of expansion rate (%) versus volumetric capacity (mAh/cc), showing changes in expansion rate for coin half-cells according to Example 7 and Comparative Example 1.

Referring to FIG. 6, the coin half-cell of Example 7 exhibited great reduction in expansion.

In contrast, the coin half-cell of Comparative Example 1 did not exhibit reduction in expansion.

3) Example 4 and Comparative Example 5

The coin half-cells of Example 4 and Comparative Example 5 were fully charged with a C-rate of 0.2 C. Then, a rate of change of a battery thickness was measured to evaluate the expansion rate. The measurement results are shown in FIG. 7.

Figure 7:
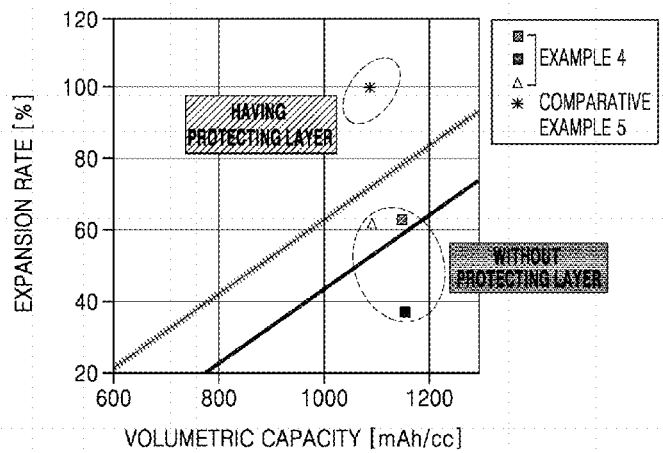
FIG. 7 is a graph of expansion rate (%) versus volumetric capacity (mAh/cc), showing changes in expansion rate for coin half-cells according to Example 4 and Comparative Example 5.

Referring to FIG. 7, the coin half-cell of Example 4 exhibited great reduction in expansion. In contrast, the coin half-cell of Comparative Example 5 having a protective layer not containing aluminum oxide did not exhibit capacity characteristics.

Evaluation Example 4: Capacity Retention

The initial efficiency and capacity retention of the coin half-cells of Example 4 and Comparative Example 1 were determined according to Equation 2. The results of evaluation of capacity retention for the coin half-cells of Example 4 and Comparative Example 1 are as shown in FIGS. 8 and 9.

$$\text{Capacity retention (\%)} = (\text{discharge capacity at the } 100^{th} \text{ cycle}/\text{discharge capacity at the } 1^{st} \text{ cycle}) \times 100\% \quad \text{Equation 2}$$

Figure 8:
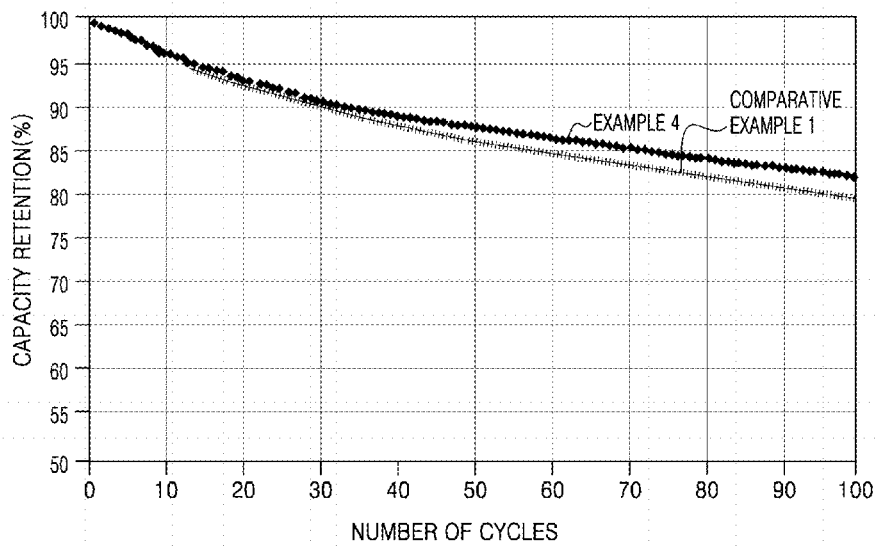
FIG. 8 is a graph of capacity retention (%) versus number of cycles, showing changes in capacity retention for coin half-cells according to Example 4 and Comparative Example 1.
Figure 9:
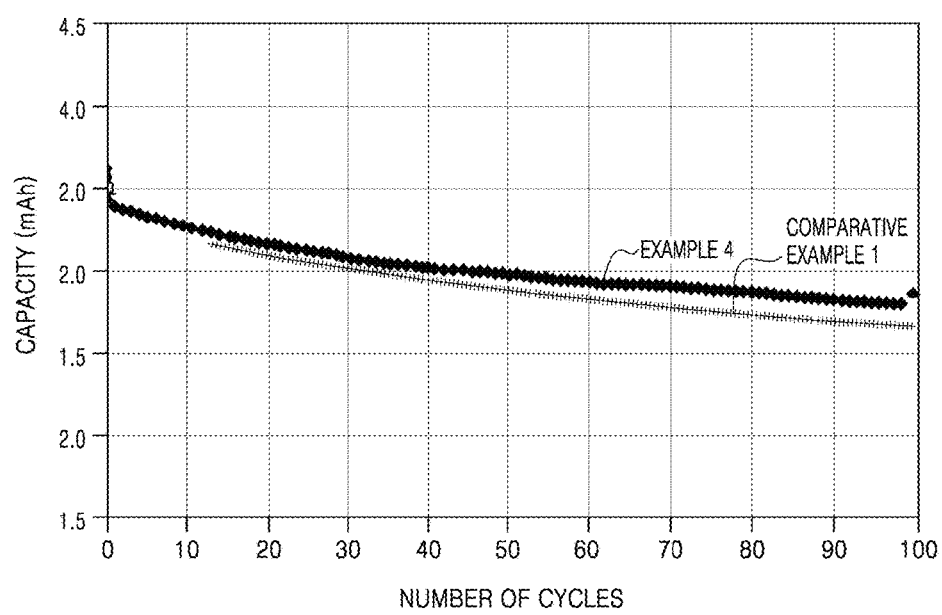
FIG. 9 is a graph of capacity (mAh) versus number of cycles, showing changes in discharge capacity for coin half-cells according to Example 4 and Comparative Example 1.

Referring to FIGS. 8 and 9, the coin half-cell of Example 4 was found to have improved capacity retention and discharge characteristics, as compared with the coin half-cell of Comparative Example 1.

As apparent from the foregoing description, a negative electrode according to one or more embodiments includes a protective layer, which may prevent structural collapse of the negative electrode caused by volume expansion and thus, the negative electrode may have enhanced durability and a decreased expansion rate. When this negative electrode is used in a lithium secondary battery, the lithium secondary battery may have an enhanced lifespan.

It should be understood that embodiments described herein should be considered in a descriptive sense only and not for purposes of limitation. Descriptions of features or aspects within each embodiment should be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A negative electrode for a lithium secondary battery, the negative electrode comprising:
    a negative active material layer comprising a negative active material, a first binder, and a conductive agent, wherein the negative active material layer is on a current collector, and wherein negative active material comprises a carbonaceous material, silicon, a silicon alloy, a silicon-carbonaceous material complex, tin, a tin alloy, a tin-carbon complex, aluminum, or a combination thereof; and
    a protective layer disposed on the negative active material layer, wherein the protective layer is in direct contact with the current collector and comprises a nonaqueous or aqueous second binder, and an inorganic material, wherein, in the protective layer comprising the aqueous second binder and the inorganic material, an amount of the inorganic material is about 65 parts by weight or greater, based on 100 parts by weight of the protective layer, and wherein in the protective layer comprising the nonaqueous second binder and the inorganic material, the amount of the inorganic material is in a range of about 5 parts to about 25 parts by weight, based on 100 parts by weight of the protective layer.

2. The negative electrode of claim 1, wherein, in the protective layer comprising the aqueous second binder and the inorganic material, the amount of the inorganic material is in a range of about 70 parts to about 95 parts by weight, based on 100 parts by weight of the protective layer.

3. The negative electrode of claim 1, wherein, in the protective layer comprising the nonaqueous second binder and the inorganic material, an amount of the inorganic material is in a range of about 10 parts to about 20 parts by weight, based on 100 parts by weight of the protective layer.

4. The negative electrode of claim 1, wherein the inorganic material comprises a surface-treatment comprising an organic silane.

5. The negative electrode of claim 4, wherein the organic silane is a compound represented by Formula 3:

$R^1_m SiX_{4-m}$  Formula 3 wherein, in Formula 3, each X is independently hydrogen, a halogen atom, a $C_1$-$C_{12}$ alkoxy group, a $C_1$-$C_{12}$ acyloxy group, a $C_1$-$C_{12}$ alkylcarbonyl group, a $C_1$-$C_{12}$ alkoxycarbonyl group, or $N(R^2)_2$, wherein each $R^2$ group is independently hydrogen or a $C_1$-$C_{12}$ alkyl group, each $R^1$ group is independently a $C_1$-$C_{12}$ alkyl group, a $C_2$-$C_{12}$ alkenyl group, a $C_2$-$C_{12}$ alkynyl group, a $C_6$-$C_{12}$ aryl group, a $C_7$-$C_{12}$ arylalkyl group, a $C_7$-$C_{12}$ alkylaryl group, a $C_8$-$C_{12}$ arylalkenyl group, a $C_8$-$C_{12}$ alkenylaryl group, a $C_8$-$C_{12}$ arylalkynyl group, a $C_8$-$C_{12}$ alkynylaryl group, or a $C_2$-$C_{12}$ alkylcarbonyl group, and m is an integer from 1 to 3.

6. The negative electrode of claim 4, wherein the organic silane comprises aminosilane, mercaptosilane, (meth)acrylsilane, epoxysilane, haloaryl silane, haloalkyl silane, iso(thio)cyanate silane, haloaryl silane, haloalkyl aryl silane, carbodiimide silane, aldehyde-functional silane, alkoxysilane, or a combination thereof.

7. The negative electrode of claim 4, wherein the organic silane comprises γ-methacryloxy propyl trimethoxysilane, 4-aminobutyl methyl diethoxysilane, 3-aminopropyl trimethoxysilane, N-2-aminoethyl-3-aminopropyl diethylisopropoxysilane, (mercaptomethyl)dimethylethoxysilane, di-4-mercaptobutyl dimethoxysilane, 3-mercaptopropyl triisopropoxysilane, 3-methacryloxypropyl dimethylethoxysilane, 3-acryloxypropyl trimethoxysilane, (3-glycidoxypropyl)methyl dimethoxysilane, 2-(3,4-epoxycyclohexyl)ethyl trimethoxysilane, 3-chloropropyl trimethoxysilane, 4-bromobutyl methyl dibutoxysilane, 5-iodohexyl diethylmethoxysilane, 3-isocyanatepropyl trimethoxysilane, 3-isothiocyanatepropylmethyl dimethoxysilane, 3-hydroxybutyl isopropyl dimethoxysilane, bis(2-hydroxyethyl)-3-aminopropyl triethoxysilane, bromophenyl trimethoxysilane, (2-(iodophenyl)ethyl)ethyl dimethoxysilane, bis(chloromethyl phenyl)dimethoxysilane, bromomethyl phenyl dimethylisopropoxysilane, bis(propyl trimethoxysilane)carbodiimide, N-ethyl-N-(propylethoxy dimethoxysilane)-carbodiimide, 3-(trimethoxysilyl)propanol, (3,5-hexadione)triethoxysilane, 3-(trimethoxysilyl)propyl acetoacetate, 3-aminopropyl trimethoxysilane, 2-aminopropyl trimethoxysilane, N-(2-aminoethyl)-3-aminopropyl trimethoxysilane, N-(2-aminoethyl)-3-aminopropyl methyl dimethoxysilane, 3-ureidpropyl trimethoxysilane, N-ethoxycarbonyl-3-aminopropyl trimethoxysilane, N-triethoxysilylpropyl triethylenetriamine, N-trimethoxysilylpropyl triethylenetriamine, 10-triethoxysilyl-1,4,7-triazadecane, 10-trimethoxysilyl-1,4,7-triazadecane, 9-trimethoxysilyl-3,6-azononyl acetate, 3-(triethoxysilyl)propyl succinic acid anhydride, N-benzyl-3-aminopropyl trimethoxysilane, N-phenyl-3-aminopropyl trimethoxysilane, N-bis-oxyethylene-3-aminopropyl trimethoxysilane, (methacryloxy)propyl trimethoxysilane, or a combination thereof.

8. The negative electrode of claim 1, wherein the inorganic material of the protective layer comprises graphite, carbon black, carbon fibers, carbon nanotubes, acetylene black, Ketjen black, Super P, surface-treated aluminum oxide ($Al_2O_3$), surface-treated silica, zinc oxide, antimony oxide, titanium oxide, zirconium oxide, or a combination thereof.

9. The negative electrode of claim 1, wherein the protective layer comprises the nonaqueous second binder and the inorganic material, and wherein the inorganic material comprises a surface-treatment comprising an organic silane.

10. The negative electrode of claim 1, wherein the nonaqueous second binder comprises a polyvinylidene fluoride, a polyacrylonitrile, a polyvinyl chloride, a polyvinylpyrrolidone, a polytetrafluoroethylene, a polyfunctional urethane acrylate, a polyfunctional urethane methacrylate, a polyfunctional acrylate, a polyfunctional methacrylate, a crosslinked product thereof, or a combination thereof.

11. The negative electrode of claim 10, wherein the polyfunctional urethane acrylate is a compound represented by Formula 1:

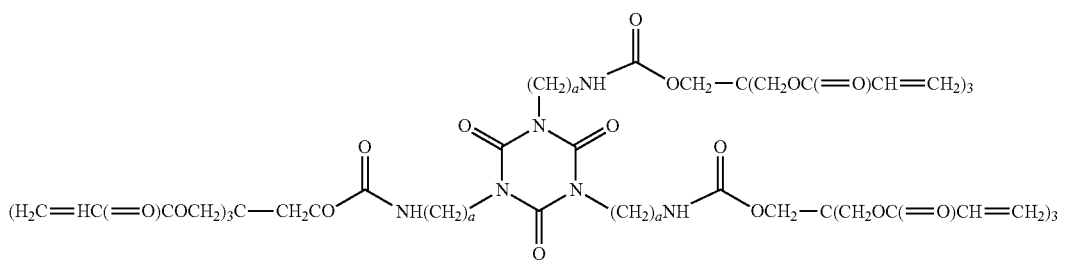

Formula 1 wherein, in Formula 1, a is an integer from 1 to 15.

12. The negative electrode of claim 10, wherein, the polyfunctional urethane acrylate is a compound represented by Formula 1a

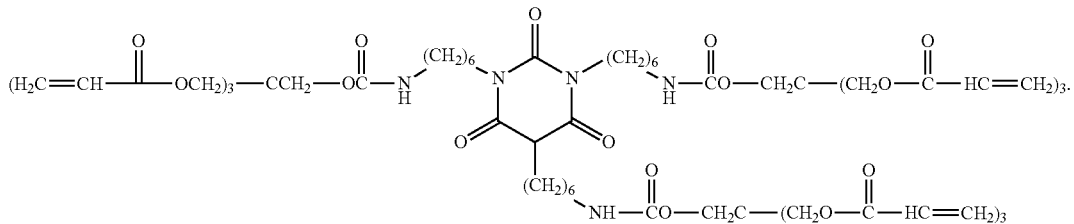

Formula 1a

13. The negative electrode of claim 1, wherein the aqueous second binder is a copolymer of vinyl alcohol and an ethylenically unsaturated carboxylic acid alkali metal-neutralized product.

14. The negative electrode of claim 1, wherein the second binder comprises a vinyl alcohol-sodium acrylate copolymer, a vinyl alcohol-potassium acrylate copolymer, a vinyl alcohol-potassium methacrylate copolymer, a vinyl alcohol-sodium methacrylate copolymer, or a combination thereof.

15. The negative electrode of claim 1, wherein the first binder comprises a styrene-butyl acrylate rubber, a carboxymethyl cellulose-styrene-butadiene rubber copolymer, a carboxymethyl cellulose, a hydroxypropyl cellulose, or a combination thereof.

16. The negative electrode of claim 1, wherein a thickness of the protective layer is in a range of about 3 micrometers to about 15 micrometers.

17. The negative electrode of claim 1, wherein a ratio of a thickness of the negative active material layer to a thickness of the protective layer is in a range of about 10:1 to about 10:3.

18. The negative electrode of claim 1, wherein the negative active material comprises silicon, tin, aluminum, carbon, or a combination thereof.

19. The negative electrode of claim 1, wherein the protective layer comprises:
   graphite and a vinyl alcohol-sodium acrylate copolymer; or
   surface-treated aluminum oxide, polyvinylidene fluoride, and a polyfunctional urethane acrylate.

20. A lithium secondary battery comprising the negative electrode according to claim 1.

* * * * *